United States Patent Office

Re. 27,663
Reissued June 12, 1973

27,663

PROCESS FOR THE MANUFACTURE OF VINYL ESTERS OF CARBOXYLIC ACIDS

Hans Fernholz, Fischbach, Taunus, Hans-Joachim Schmidt, Frankfurt am Main, and Friedrich Wunder, Florsheim am Main, Germany, assignors to Farbwerke Hoechst Aktiengesellschaft vormals Meister Lucius & Bruning, Frankfurt am Main, Germany No Drawing. Original No. 3,625,998, dated Dec. 7, 1971, Ser. No. 708,509, Feb. 27, 1968. Application for reissue May 22, 1972, Ser. No. 255,869
Claims priority, application Germany, Mar. 3, 1967, F 51,719; Aug. 10, 1967, F 53,201
Int. Cl. C07c *67/04*
U.S. Cl. 260—497 A 14 Claims

Matter enclosed in heavy brackets [ ] appears in the original patent but forms no part of this reissue specification; matter printed in italics indicates the additions made by reissue.

ABSTRACT OF THE DISCLOSURE

Preparation of vinyl esters of carboxylic acids in the gaseous phase by reacting ethylene, oxygen and carboxylic acids at elevated temperatures in the presence of a catalyst consisting of a salt of a noble metal of the eighth group of the periodic system and 0.01 to 200 g. cadmium in the form of a cadmium salt of a carboxylic acid, this catalyst being supported on a carrier.

The present invention relates to a process for the manufacture of vinyl esters of carboxylic acids.

It has already been proposed to make esters of carboxylic acids with unsaturated alcohols by reacting carboxylic acids with olefins in the presence of noble metal compounds, performing the reaction in the presence of molecular oxygen and redox systems consisting of metal salts which reversibly change their valency under the reaction conditions. The said process may be carried out in the liquid or the gaseous phase under atmospheric pressure or pressures of up to 25 atmospheres gage at temperatures within the range of from 0° to 250° C., the presence of an alkali metal salt of the carboxylic acid used being advantageous.

In a mode of executing the process in the gaseous phase, ethylene, air and vapors of acetic acid are, for example, passed over a catalyst consisting of pumice impregnated with palladium acetate, sodium acetate and iron acetate.

According to another proposal, olefins are reacted with carboxylic acids and oxygen to obtain esters of carboxylic acids with unsaturated alcohols, using palladium acetate as the catalyst in the absence of redox systems. However, the space-time yields obtained by that process are extremely poor. According to other proposals, the vinylation in the gaseous phase is carried out using catalysts consisting of metallic palladium or palladium oxide supported on carriers.

The present invention provides a process for the manufacture of vinyl esters of carboxylic acids in the gaseous phase by passing ethylene, oxygen or gases containing oxygen, and carboxylic acids at elevated temperatures and, if desired, elevated pressure, over a catalyst consisting of a carrier, advantageously silicic acid, and at least one salt of at least one noble metal of the 8th group of the Mendeleeff Periodic Table, advantageously the palladium salt of the carboxylic acid to be used, wherein the catalyst additionally contains 0.01 to 200 grams, per liter, of cadmium in the form of the cadmium salt of a carboxylic acid. The process in accordance with the invention enables high space-time yields to be obtained with the help of catalysts of noble metal salts even in the absence of redox systems.

Particularly good results are obtained by adding, per liter of catalyst, 5 to 40 grams cadmium in the form of the cadmium salt of a carboxylic acid. In special cases, the reaction can even be carried out successfully by adding the bound cadmium in an amount smaller than 0.01 gram per liter of the catalyst system consisting of noble metal salt and carrier.

The presence of an organic cadmium salt is decisive for the process of the invention. The rest of the carboxylic acid in this salt is not, therefore, critical and may be derived from any desired carboxylic acids which may also carry substituents that are inert under the reaction conditions. When carrying out the process on an industrial scale there are generally used, however, the cadmium salts of unsubstituted carboxylic acids with at most 10 carbon atoms, preferably those of unsubstituted aliphatic monocarboxylic acids with 2 to 5 carbon atoms, for example, the cadimum salts of acetic acid, propionic acid, n- or isobutyric acid and the different valeric acids. It is particularly advantageous to use the cadmium salt of the carboxylic acid to be reacted with ethylene and oxygen to the desired vinyl ester. The cadmium salts act as oxygen carriers, i.e., as agents transferring oxygen.

Instead of the cadmium salt of a carboxylic acid it is also possible to use a compound that forms the said salt in situ. For example, cadmium oxide or cadmium carbonate may be introduced at the beginning of the reaction. These compounds are then converted to the catalytically active cadmium salt of the corresponding carboxylic acid by the carboxylic acid passed in the form of vapor over the catalyst system.

The carboxylic acids to be reacted with ethylene may belong to the aliphatic, cycloaliphatic araliphatic or aromatic series and may contain one or more carboxyl groups. It is essential that the carboxylic acid used should be volatile under the reaction conditions. It therefore generally has at most 10 carbon atoms. Advantageously, unsubstituted aliphatic monocarboxylic acids with 2 to 4 carbon atoms, i.e. propionic acid, n- or isobutyric acid and preferably acetic acid, are used for the reaction.

The oxygen may be used in a pure elementary form or in admixture with inert gases, for example in the form of air. When carrying out the process in industry, it is generally advantageous that the mixtures of ethylene and oxygen to be used should be outside the known explosion limits.

As salts of the noble metals of the 8th group of the Mendeleeff Periodic Table there may be used those of ruthenium, rhodium iridium, platinum and advantageously palladium. Corresponding salt mixtures may also be used. It is particularly advantageous to use the noble metals in the form of their salts with the carboxylic acid to be reacted. When ethylene is reacted with acetic acid, palladium acetate is therefore preferred as the catalyst.

The reaction temperatures are within the range of from 0° to 300° C., advantageously from 120° to 250° C., and the pressure is within the range of from 0 to 25 atmospheres gage, advantageously from 2 to 15 atmospheres gage.

As carrier for the catalyst, a great many different inert materials may be used, for example coal, aluminum oxide, silicates such as burned clay or aluminum silicates, silicon carbide, zirconium and silica gel. It is particularly advantageous to use a silicic acid having a specific surface within the range of from 40 to 300 $m.^2/g.$ and an average pore radius within the range of from 50 to 2,000 A.

The reaction is advantageously carried out in the presence of one or more alkali metal salts of the carboxylic acid to be reacted, preferably the sodium or even more advantageously the potassium salt thereof. The alkali metal salts are advantageously used in amounts within the range of from 0.1 percent to 25 percent, preferably from 1 percent to 10 percent, calculated on the weight of the catalyst system consisting of carrier and catalyst.

The reaction in accordance with the invention is advantageously carried out in the presence of redox systems transferring oxygen, whereby the extent of conversion and the yield are often further increased. There may be used the known organic and advantageously inorganic redox systems which are capable of maintaining the catalytic reaction by reversibly changing their oxidation stages under the reaction conditions.

Suitable inorganic redox systems are, for example, the salts of metals capable of changing their valences, e.g. of copper, iron, manganese, cerium, vanadium, antimony, lead, chromium and titanium. Iron salts are particularly advantageous.

In another advantageous form of the process of the invention by which a reduction of the selectivity of the catalyst can be substantially prevented during a prolonged operation, the part of the catalyst which comes into contact first with the reaction gases is periodically or continuously exchanged. This is achieved either by periodically reversing the direction of flow of the reaction gases over the cataysl or by a periodical or continuous removal of a part of the catalyst at the inlet of the reactor and a corresponding addition of this part of the catalyst at the outlet of the reactor so that the catalyst is conducted in a cycle towards the stream of the reaction gases.

Both measures have substantially the same effect. The catalyst may be passed, for example, in this manner through a cycle every 3 weeks.

In another form of the last-mentioned mode of executing the process of the invention, the part of catalyst that comes first into contact with the reaction gases is exchanged by thoroughly mixing the whole catalyst continuously or periodically. When using, for example, a reactor that is in a vertical position the current of the gases introduced from below may be increased for a short time to such an extent that the catalyst is thoroughly mixed.

In another form of the process of the invention, a fluidized catalyst is used. By fluidized catalyst there is meant a fine-grained catalyst of such a grain size that the catalyst is kept in constant motion in the form of a fluidized bed by the current velocity of the reaction gases under the reaction conditions. Catalysts of a grain size within the range of from 0.01 to 1 mm. in diameter are particularly advantageous for this purpose.

The following examples serve to illustrate the invention, but are not intended to limit it, the term "Nl" meaning liter under normal conditions of temperature and pressure.

EXAMPLE 1

(a) 131 g.≙250 cc. of a carrier of silicic acid were impregnated with a solution of 2.5 grams of palladium acetate in 100 cc. of glacial acetic acid and dried. Over the catalyst so obtained 57 Nl of ethylene, 95 grams of acetic acid and 44 Nl of air were passed per hour at 150° C. under a pressure of 4 atmospheres gage. The space-time yield was 30 g./lh. of vinyl acetate.

(b) When the same amount of the carrier described sub (a) was impregnated with a solution of 2.5 grams of palladium acetate and 5 grams of cadmium acetate in 100 cc. of glacial acetic acid, without subsequent drying, while otherwise proceeding under the same conditions as indicated sub (a), a space-time yield of 102 g./lh. of vinyl acetate and a yield of 98 percent calculated on the ethylene which had been reacted were obtained.

EXAMPLE 2

(a) 131 g.≙250 cc. of a carrier of silicic acid were impregnated with a solution of 2.5 grams of palladium acetate and 5 grams of potassium acetate in 100 cc. of glacial acetic acid and dried. Over the catalyst so obtained 57 Nl ethylene, 95 grams acetic acid and 44 Nl of air were passed per hour at 150° C., under a pressure of 4 atmospheres gage. A space-time yield of 45 g./lh. of vinyl acetate was obtained.

(b) When the same amount of the carrier indicated sub (a) was impregnated with a solution of 2.5 grams of palladium acetate, 5 grams of potassium acetate and 5 grams of cadmium acetate in 100 cc. of glacial acetic acid while otherwise proceeding under the same conditions as described sub (a), a space-time yield of 116 g./lh. and a yield of 91 percent calculated on the ethylene which had been reacted were obtained.

EXAMPLE 3

(a) 131 g. ≙ 250 cc. of a carrier of silicic acid where impregnated with a solution of 2.5 grams of palladium acetate, 5 grams of iron acetate and 5 grams of potassium acetate in 100 cc. of glacial acetic acid and dried. Over the catalyst so obtained 57 Nl of ethylene, 95 grams of acetic acid and 44 Nl of air were passed per hour at 150° C. under a pressure of 4 atmospheres gage. A space-time yield of 42 g./lh. of vinyl acetate was obtained. The yield was 86 percent calculated on the ethylene which had been reacted.

(b) When proceeding under the same conditions as described sub (a) but using 5 grams of copper acetate instead of 5 grams of iron acetate, a space-time yield of 46 g./lh. and a yield of 41 percent were obtained.

(c) When the same amount of the carrier described sub (a) was impregnated with a solution of 2.5 grams of palladium acetate, 5 grams of potassium acetate, 5 grams of iron acetate and 5 grams of cadmium acetate in 100 cc. of glacial acetic acid, while otherwise proceeding under the same conditions as described sub (b), a space-time yield of 124 g./lh. of vinyl acetate was obtained.

The results of Examples 1 to 3 are summed up in the following table which clearly shows the effect of the cadmium compound on the efficacy of the catalyst.

TABLE

| Catalyst | Vinyl acetate, g./lh. | |
|---|---|---|
| | Without cadmium | With cadmium |
| Palladium acetate | 30 | 102 |
| Palladium acetate + potassium acetate | 45 | 116 |
| Palladium acetate + potassium acetate + iron acetate | 42 | 124 |

EXAMPLE 4

262 g.≙500 cc. of a carrier of silicic acid were moistened with 40 cc. of acetic acid and then impregnated with a solution of 1.8 grams of palladium acetate and 12 grams of cadmium acetate in 70 cc. of acetic acid. After drying, 200 Nl of ethylene, 280 grams of acetic acid and 130 Nl of air were passed, per hour, over the catalyst at 160° C. under a pressure of 5 atmospheres gage. The space-time yield was 98 g./lh. of vinyl acetate.

EXAMPLE 5

A mixture of 1,400 grams of acetic acid, 1,000 Nl of ethylene, 115 Nl of oxygen and 315 Nl of nitrogen was passed, per hour, at 160 to 170° C. under a pressure of 5 atmospheres gage over 2.2 liters of the catalyst described in Example 2b, consisting of palladium acetate, potassium acetate and cadimium acetate. A space-time yield of 145 g./lh. of vinyl acetate and a yield of 97.4 percent calculated on the ethylene which had been reacted were obtained, the rest passed over into carbon dioxide. When the pressure and the temperature were further increased, considerably higher space-time yields could be obtained, without the selectivity of the catalyst being reduced.

EXAMPLE 6

(a) Without exchange of catalyst or reversal of direction of flow:

2.2 liters (1,150 grams) of a carrier of silicic acid were impregnated with a solution of 21.9 grams of palladium acetate, 44 grams of potassium acetate, 1.2 grams of iron acetate and 44 grams of cadmium acetate in 870 cc. of glacial acetic acid and dried. Over the catalyst so obtained a mixture of 1,400 grams of acetic acid, 1000 Nl of ethylene, 115 Nl of oxygen and 315 Nl of nitrogen was passed per hour at 170° C. under a pressure of 5 atmospheres gage. A space-time yield of 145 g./lb. of vinyl acetate and a yield of 97.4 percent calculated on the ethylene which had been reacted were obtained. The rest passed over into carbon dioxide.

After a working time of 3,000 hours the yield decreased to 83 percent of the ethylene which had undergone reaction.

(b) With reversal of direction of flow;

Under the conditions described sub (a), the direction of flow of the reaction gases over the catalyst was reversed every week. After a working time of 3,000 hours no reduction of the yield calculated on the ethylene could be observed and after 5,000 working hours the yield calculated on the ethylene still amounted to 94 percent.

(c) With exchange of catalyst:

Under the conditions described sub (a) a third of the catalyst was removed from the inlet of the reactor each week and immediately reintroduced at the outlet of the reactor without any treatment. After 3,000 hours of working no reduction of the selectivity could be observed, nor after 5,000 hours of working.

What is claimed is:

1. A gas-phase process for the manufacture of a vinyl ester of a carboxylic acid having two to four carbon atoms which comprises passing ethylene, oxygen or an oxygen-containing gas, and said carboxylic acid over a catalyst consisting essentially of a carrier and a palladium salt of a carboxylic acid, said catalyst additionally containing 0.01 to 200 grams per liter of catalyst, of the cadmium salt of a carboxylic acid.

2. The process of claim 1 wherein the catalyst contains the cadmium salt of a carboxylic acid in an amount within the range of from 5 to 40 grams per liter.

3. The process of claim 1 wherein the cadmium salt is the salt of the carboxylic acid to be reacted.

4. The process of claim 1 wherein the reaction is carried out in the presence of an alkali metal salt of the carboxylic acid to be reacted.

5. The process of claim 1 wherein the reaction is carried out in the presence of a redox system.

6. The process of claim 5 wherein the redox system consists of a salt of iron.

7. The process of claim 1 wherein the part of the catalyst that comes first into contact with the reaction gases is exchanged periodically or continuously.

8. The process of claim 1 wherein the catalyst that comes first into contact with the reaction gases is exchanged by a periodical reversal of the direction of flow of the gases in the catalyst.

9. The process of claim 1 wherein the catalyst that comes first into contact with the reaction gases is exchanged by continuously or periodically mixing the catalyst.

10. The process of claim 1 wherein the catalyst is a fluidized catalyst.

11. The process of claim 1 wherein the palladium salt is the salt of the carboxylic acid to be reacted.

12. The process of claim 1 wherein the reaction is carried out at an elevated pressure.

13. The process of claim 1 wherein the carrier is silicic acid.

14. The process of claim 1 wherein vinyl acetate is made from ethylene and acetic acid with palladium acetate and cadmium acetate as a catalyst and silicic acid as a carrier in the presence of sodium or potassium acetate and iron acetate.

References Cited

The following references, cited by the Examiner, are of record in the patented file of this patent or the original patent.

UNITED STATES PATENTS

| | | | |
|---|---|---|---|
| 3,190,912 | 6/1965 | Robinson | 260—497 A |
| 3,306,930 | 2/1967 | Copelin et al. | 2660—497 A |

FOREIGN PATENTS

| | | | |
|---|---|---|---|
| 1,407,526 | 6/1965 | France | 260—497 |

VIVIAN GARNER, Primary Examiner

U.S. Cl. X.R.

252—430, 431 C; 260—410.9 N, 468 R, 469, 475 N, 476 R, 485 N